US010272605B2

(12) United States Patent
Bustle et al.

(10) Patent No.: US 10,272,605 B2
(45) Date of Patent: *Apr. 30, 2019

(54) APPARATUS AND METHOD OF FORMING A COMPOUND STRUCTURE

(71) Applicant: Apple Inc., Cupertino, CA (US)

(72) Inventors: Benjamin Shane Bustle, Cupertino, CA (US); Tyler B. Cater, San Jose, CA (US); Derek C. Krass, Cupertino, CA (US); Scott A. Myers, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,346

(22) Filed: Jul. 5, 2018

(65) Prior Publication Data
US 2018/0311875 A1  Nov. 1, 2018

Related U.S. Application Data

(63) Continuation of application No. 15/059,100, filed on Mar. 2, 2016, now Pat. No. 10,016,921.
(Continued)

(51) Int. Cl.
A47B 81/00 (2006.01)
B29C 45/14 (2006.01)
(Continued)

(52) U.S. Cl.
CPC .. *B29C 45/14786* (2013.01); *B29C 45/14311* (2013.01); *B29K 2101/12* (2013.01);
(Continued)

(58) Field of Classification Search
CPC .......................................... G06F 1/181
(Continued)

(56) References Cited

U.S. PATENT DOCUMENTS 10,016,921 B2 * 7/2018 Bustle ............... B29C 45/14311
2008/0070001 A1  3/2008 Lasarov et al.
(Continued)

FOREIGN PATENT DOCUMENTS

CN     102484308    5/2012
CN     103037642    4/2013
(Continued)

*Primary Examiner* — Matthew W Ing
(74) *Attorney, Agent, or Firm* — Brownstein Hyatt Farber Schreck, LLP

(57) ABSTRACT

Compound structures and methods for forming the same are described. The compound structures can be used to form an enclosure. The enclosure may be formed from metal, such as aluminum, and further include one or more non-metal regions that allow for transmission and receipt of electromagnetic waves, such as radio frequency waves. The non-metal region can include a first section, a second section, and an optional cosmetic section. The first section can be firmly molded onto a metal section of the enclosure by small pores formed within the metal section. The second section can engage with interlock features of the first section. The optional cosmetic section can cover the first section and the second section such that the first section and the second section are not visible from an exterior of the enclosure.

20 Claims, 8 Drawing Sheets

Related U.S. Application Data

(60) Provisional application No. 62/156,143, filed on May 1, 2015.

(51) Int. Cl.
    *B29K 101/12*     (2006.01)
    *B29L 31/34*     (2006.01)
    *H04M 1/02*     (2006.01)

(52) U.S. Cl.
    CPC ............... *B29L 2031/3437* (2013.01); *B29L 2031/3456* (2013.01); *B29L 2031/3481* (2013.01); *H04M 1/0202* (2013.01)

(58) Field of Classification Search
    USPC .......................................... 312/223.1, 223.2
    See application file for complete search history.

(56) References Cited

U.S. PATENT DOCUMENTS

| | | |
|---|---|---|
| 2013/0318766 A1 | 12/2013 | Kiple et al. |
| 2014/0361934 A1 | 12/2014 | Ely et al. |
| 2015/0084217 A1 | 3/2015 | Cadotte, Jr. et al. |

FOREIGN PATENT DOCUMENTS

| | | |
|---|---|---|
| CN | 104009279 | 8/2014 |
| WO | WO2012/094640 | 7/2012 |
| WO | WO2014/053701 | 4/2014 |
| WO | WO2014/197328 | 12/2014 |

\* cited by examiner

APPARATUS AND METHOD OF FORMING A COMPOUND STRUCTURE

CROSS REFERENCE TO RELATED APPLICATION

This application is a continuation patent application of U.S. patent application Ser. No. 15/059,100, filed Mar. 2, 2016 and titled "Apparatus and Method of Forming a Compound Structure," now U.S. Pat. No. 10,016,921, which is a nonprovisional patent application of and claims the benefit of U.S. Provisional Application No. 62/156,143, filed May 1, 2015 and titled "Apparatus and Method of Forming a Compound Structure," the disclosures of which are hereby incorporated herein by reference in their entireties.

FIELD

The described embodiments relate generally to forming compound structures. In particular, the present embodiments relate to forming compound structures that can be used with an enclosure used for electronic devices. More specifically, a structure having a radio frequency (RF) transparent section and an RF opaque section can be formed.

BACKGROUND

Many electronic devices include an antenna or multiple antennas capable of receiving and/or transmitting electromagnetic ("EM") energy in the form of EM radio waves. Typically, the antenna(s) are enclosed within an enclosure that houses several other electronic components. In some cases, the enclosure is formed from a metal, such as aluminum or aluminum alloy, which can interfere with transmission and receipt of EM radio waves. In these cases, the enclosure may include a non-metal section that allows EM radio waves to permeate through the enclosure.

It may be difficult, however, to attach a non-metal material to a metal material with a strong enough bond to withstand some of the forces experienced by the electronic device. For example, if the bond is not strong enough, a force created by a drop event can cause disengagement of the metal and non-metal portions. Adhesives can be used to help secure the metal and non-metal portions. However, even thin layers of adhesive can be visible and detract from the aesthetic appeal of the enclosure. Fasteners, such as clip and screws, can be used to reinforce the bond. However, fasteners can also be visible and unattractive, or they can take up valuable space within the enclosure that can be used for internal components of the electronic device.

SUMMARY

This paper describes various embodiments that relate to forming enclosures for electronic devices that include radio frequency opaque sections, such as metal sections, and radio frequency transparent sections, such as plastic sections. The methods involve forming radio frequency transparent structures that are strongly bonded to the metal sections and that provide improved radio transmission and/or cosmetic appeal compared to conventional methods.

According to one embodiment, a compound structure is described. The compound structure includes a first metal section having a recess defining an interface surface. The interface surface has a pore with a diameter of less than one millimeter. The compound structure also includes a second metal section. The compound structure further includes a radio-frequency (RF) transparent section including an RF transparent material. The RF transparent section is engaged with the interface surface of the first metal section and wherein some of the RF transparent material is positioned within the pore.

According to another embodiment, an enclosure is described. The enclosure includes the enclosure having a first metal section and a second metal section. The enclosure includes an RF transparent section securing the first metal section with the second metal section. The RF transparent section is formed of an RF transparent material incorporated within pores of at least one of the first metal section or the second metal section. The pores have diameters of less than one millimeter.

According to a further embodiment, a method of forming an enclosure for an electronic device is described. The enclosure includes a first metal section and a second metal section. The method includes forming pores at an interface surface of the first metal section. The method also includes molding a first RF transparent section on the interface surface such that material of the first RF transparent section is molded within the pores. Molding the first RF transparent section includes forming interlock features within the first RF transparent section. The method further includes coupling the first metal section to the second metal section by molding a second RF transparent section on the second metal section and the first RF transparent section. The second RF transparent section is molded within the interlock features of the first RF transparent section.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

Figure 1:
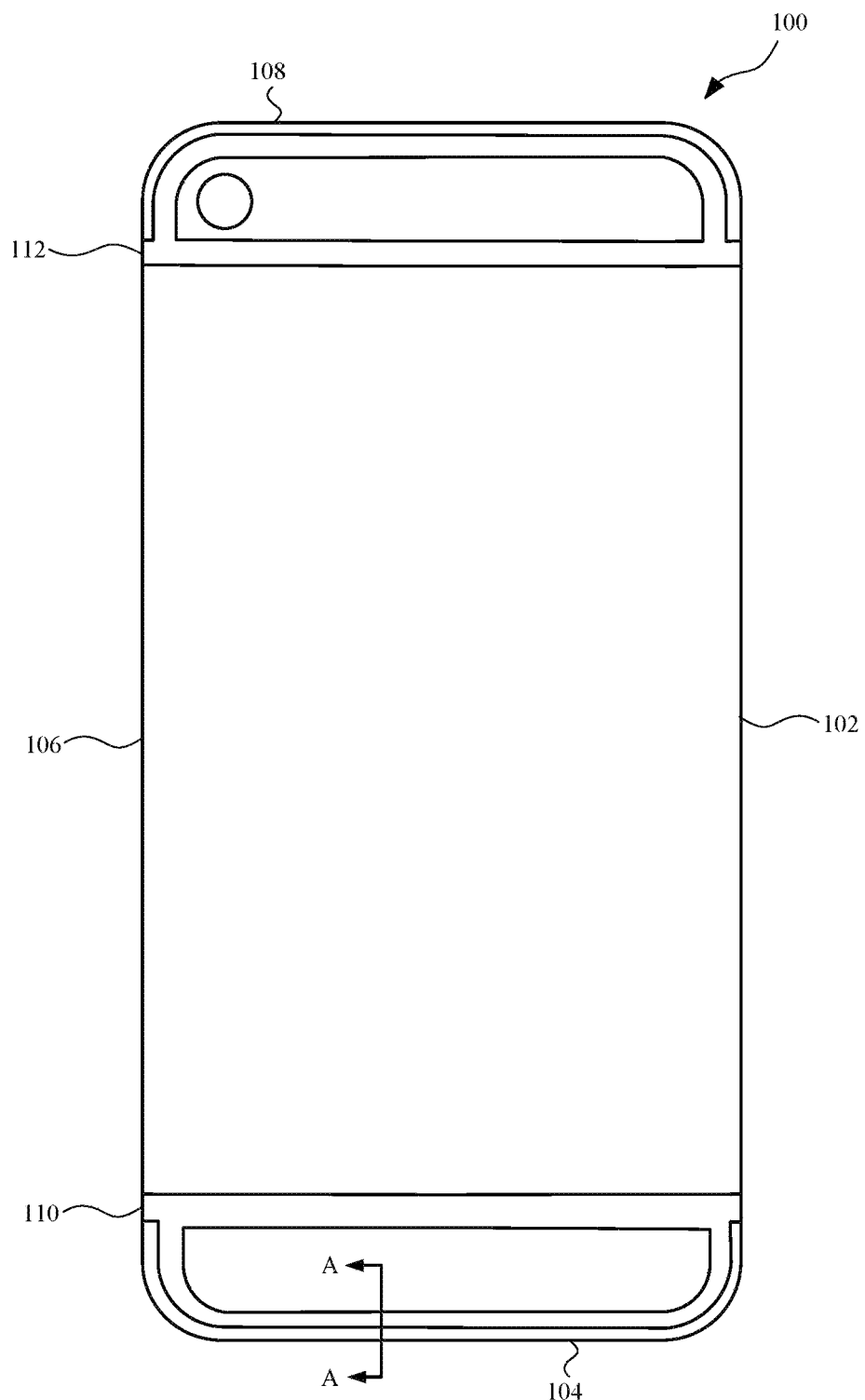
FIG. 1 shows an electronic device including an enclosure, in accordance some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Described herein are enclosures that can be used to house components that transmit and/or receive electromagnetic waves (e.g., radio frequency (RF) waves) for communications. The enclosures include RF opaque sections that generally do not allow transmission of RF waves to a sufficient degree for efficient communication. Such materials can include metal, which can provide a durability and aesthetic look and feel to the enclosure. The enclosures also include RF transparent sections that generally allow sufficient transmission of RF waves for efficient communication. Such materials can include plastic, ceramic, glass and combinations thereof. The RF transparent section(s) can be positioned proximate to antenna(s) housed within the enclosure that are designed to transmit and/or receive electromagnetic wave communications.

In a particular embodiment, the RF transparent section includes a structural RF transparent section, which can be made of a high strength resinous material, and a mediating RF transparent section, which can act to increase a transmission region of the enclosure. The mediating RF transparent section can be tightly secured to a first RF opaque section, and the structural RF transparent section can be tightly secured to a second RF opaque section. The structural RF transparent section and the mediating RF transparent section can interlock with each other using a molding process, thereby firmly coupling the first and second RF opaque sections of the enclosure. The RF transparent section can be in the form of a band that fills a gap between the RF opaque sections, creating an enclosure with a unique RF antenna region or gap that potentially increases antenna performance.

One or both of the mediating RF transparent section and structural RF transparent section can be interlocked with pore structures formed within the first and/or second RF opaque sections. The pores are generally very small, on a scale of micrometers or nanometers, providing ample surface area for extra-tight adhesion between the RF transparent section and the RF opaque sections. In some embodiments, the RF transparent section includes a cosmetic RF transparent section that covers the structural RF transparent section and the mediating RF transparent section, providing an aesthetically appealing exterior surface to the enclosure.

Methods described herein are well suited for providing cosmetically appealing structures for consumer products. For example, the methods described herein can be used to form cosmetically appealing housing or enclosures for mobile electronic devices, wearable electronic devices, portable computers, desktop computers, and electronic device accessories, such as those manufactured by Apple Inc., based in Cupertino, Calif.

These and other embodiments are discussed below with reference to FIGS. 1-5. However, those skilled in the art will readily appreciate that the detailed description given herein with respect to these Figures is for explanatory purposes and should not be construed as limiting.

FIG. 1 shows a rear view of electronic device 100, in accordance with some embodiments. In some embodiments, electronic device 100 is a mobile phone. In some embodiments, electronic device 100 is a tablet computing device. Electronic device 100 can include enclosure 102 that includes an internal cavity (not shown) that is sized and shaped to house internal components, such as one or more electromagnetic wave antennas (not shown). In some embodiments, the electromagnetic wave antenna(s) transmit and/or receive radio frequency (RF) wave communication, and can be referred to as RF antenna(s). RF transmission refers generally to the transmission of at least some frequencies within the RF spectrum. RF communication refers generally to communication using transmission and/or receipt of at least some frequencies within the RF spectrum. Examples of RF communications can include Wi-Fi radio, Bluetooth radio, cellular radio, and/or NFC radio communications.

Enclosure 102 includes first metal section 104, second metal section 106, and third metal section 108, which can be coupled by first RF transparent region 110 and second RF transparent region 112. First RF transparent region 110 and second RF transparent region 112 are RF transparent such that one or more RF antennas housed within enclosure 102 can receive or transmit RF communication through enclosure 102 via first RF transparent region 110 and second RF transparent region 112. First metal section 104 and third metal section 108 can be referred to as end pieces since they define ends of enclosure 102. Second metal section 106 can be referred to as a chassis since it can defines main side walls of enclosure 102. In some embodiments, first RF transparent region 110 and second RF transparent region 112 can appear as thin bands or lines that span a width of enclosure 102, and therefore can be referred to as antenna bands or antenna lines. In some cases, first RF transparent section 110 and second RF transparent region 112 are referred to as splits or split regions of enclosure 102.

First metal section 104, second metal section 106, and third metal section 108 are made of metal material(s), which generally do not allow electromagnetic waves (e.g., RF waves) to pass through. First metal section 104, second metal section 106, and third metal section 108 can be made of any suitable metal or metals. In some embodiments, first metal section 104, second metal section 106, and third metal section 108 are made of the same metal material to provide a continuous look and feel to enclosure 102. In a particular embodiment, first metal section 104, second metal section 106, and third metal section 108 are made of an aluminum alloy.

First RF transparent region 110 and second RF transparent region 112 are at least partially made of an RF transparent material, which is generally a material that allows at least some of the frequencies within the RF spectrum to pass through. Suitable RF transparent materials can include resins (plastics), glass and/or ceramic. In some embodiments, first RF transparent region 110 and second RF transparent region 112 are made of the same materials to give enclosure 102 a uniform look and feel. In some embodiments, electronic device 100 includes a first antenna positioned proximate to first RF transparent region 110 and a second antenna positioned proximate to second RF transparent region 112, allowing efficient RF communication to and/or from electronic device 100. In some embodiments, first metal section 104 and/or third metal section 108 can act as part of the antenna(s) housed within enclosure 102. Thus, one function of first RF transparent region 110 and second RF transparent region 112 can be to electrically isolate and ground second metal section 106.

Figure 2:
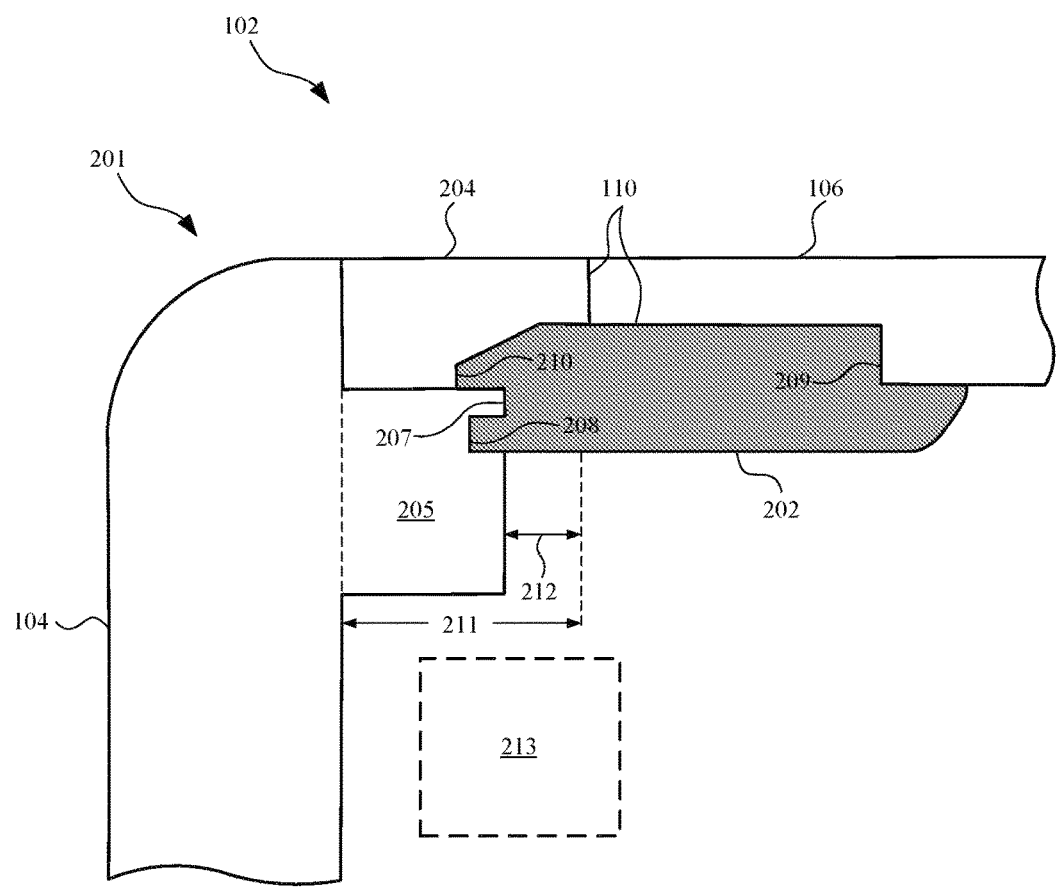
FIG. 2 shows a cross section view of a portion of the enclosure of FIG. 1, in accordance with some embodiments.

FIG. 2 shows a cross section view A-A of enclosure 102, in accordance with some embodiments. As shown, RF transparent region 110 includes two sections: structural RF transparent section 202 and cosmetic RF transparent section 204. Structural RF transparent section 202 provides structural support for the coupling of first metal section 104 and second metal section 106, and therefore can be made of a stiff material such as a stiff resin. Suitable polymer materials can include polyarylether keytone (PAEK) materials (e.g., PEEK, PEK, PEKK) and/or polysulfone materials (e.g., PSU, PPS, PES, PPSU, and PPS), and/or polyester based materials (e.g., PBT, PET). Additionally, polymer materials can also be blends and/or alloys of polymers previously stated. In some embodiments, the resinous materials include fibers, such as glass or ceramic fibers, to increase the strength of structural RF transparent section 202. The composition of structural RF transparent section 202 can also be chosen to be chemically resistant and retain its geometry when exposed to one or more additional processes subsequent manufacturing processes. For example, resin(s) that do not substantially degrade or deform when exposed to an anodizing process can be used. In some embodiments, the resin(s) do not substantially degrade or deform when exposed to ultraviolet (UV) light (e.g., by exposure to an ultraviolet curing process), chemical coating, computer numerical control ("CNC") machining, blasting (e.g., sandblasting), and/or polishing. Other factors in determining the material(s) used to form structural RF transparent section 202 include strength sufficient to withstand impact during a drop event of enclosure 102, moldability of the material(s), and ability to form an external skin that is resistant to exposing internal portions of the polymer material.

Cosmetic RF transparent section 204 is situated such that a surface of cosmetic RF transparent section 204 corresponds to exterior surface 201 of enclosure 102. Thus, exterior surface 201 of enclosure 102 is defined, in part, by surface portions of first metal section 104, second metal section 106 and cosmetic RF transparent section 204. Cosmetic RF transparent section 204 can be made of the same material as structural RF transparent section 202 or a different material. In some embodiments cosmetic RF transparent section 204 is made of a material that has more cosmetically or aesthetically appealing properties compared to structural RF transparent section 202. Thus, cosmetic RF transparent section 204 can be made of a different blend of polymer materials. For example, cosmetic RF transparent section 204 can be made of a uniform, color fade-resistant, and/or dent resistant material. Cosmetic RF transparent section 204 can include a variety of colors, such as red, blue, green, black, white, or a combination thereof. Generally, the color or colors selected provides a desired aesthetic appearance. In some embodiments, cosmetic RF transparent section 204 can also be made of a material that is resistant to degradation and/or deformation when exposed to one or more subsequent processes such as anodizing, UV light exposure, chemical coating, CNC machining, blasting, and/or polishing. Suitable materials for cosmetic RF transparent section 204 can include one or more suitable resinous, ceramic, and/or glass materials.

Cosmetic RF transparent section 204 can cover structural RF transparent section 202 such that structural RF transparent section 202 is not visible. That is, cosmetic RF transparent section 204 can prevent structural RF transparent section 202 from defining exterior surface 201 of enclosure 102. The area of external surface 201 defined by cosmetic RF transparent section 204 can be a gap defined by length 211.

First metal section 104 of enclosure 102 includes extending portion 205, which can include interlocking feature 207 configured to interlock with corresponding interlocking feature 208 of structural RF transparent section 202. In some embodiments, structural RF transparent section 202 is molded within enclosure 102 such that material of structural RF transparent section 202 molds within and engages with interlocking feature 207, forming corresponding interlocking feature 208. Interlocking features 207 and 208 can be any suitable combination of protrusions and recesses that increase the surface contact area of first metal section 104 and structural RF transparent section 202, thereby forming a stronger bond or adhesion between first metal section 104 and structural RF transparent section 202. As shown, structural RF transparent section 202 can include additional interlocking features 209 and 210 that increase the adhesion to second metal section 106 and cosmetic RF transparent section 204, respectively.

Extending portion 205 can allow for good structural integrity and adhesion between first metal section 104 and structural RF transparent section 202. However, the transmission of RF waves to and/or from antenna 213 through RF transparent section 110 is limit by extending portion 205. Specifically, extending portion 205 encroaches into the gap defined by length 211 defined by cosmetic RF transparent section 204 and reduces RF transmission to a transmission region defined by length 212. The transmission region defined by length 212 corresponds to a pathway where RF waves are free to pass. In a particular embodiment, length 211, which can correspond to a width of cosmetic RF transparent section 204, is about 2.0 mm and length 212 of the transmission region is about 0.6 mm. To address the limitations that extending portion 205 places on the RF transmission capability of enclosure 102, modifications can be made to the structure of enclosure 102.

Figure 3A:
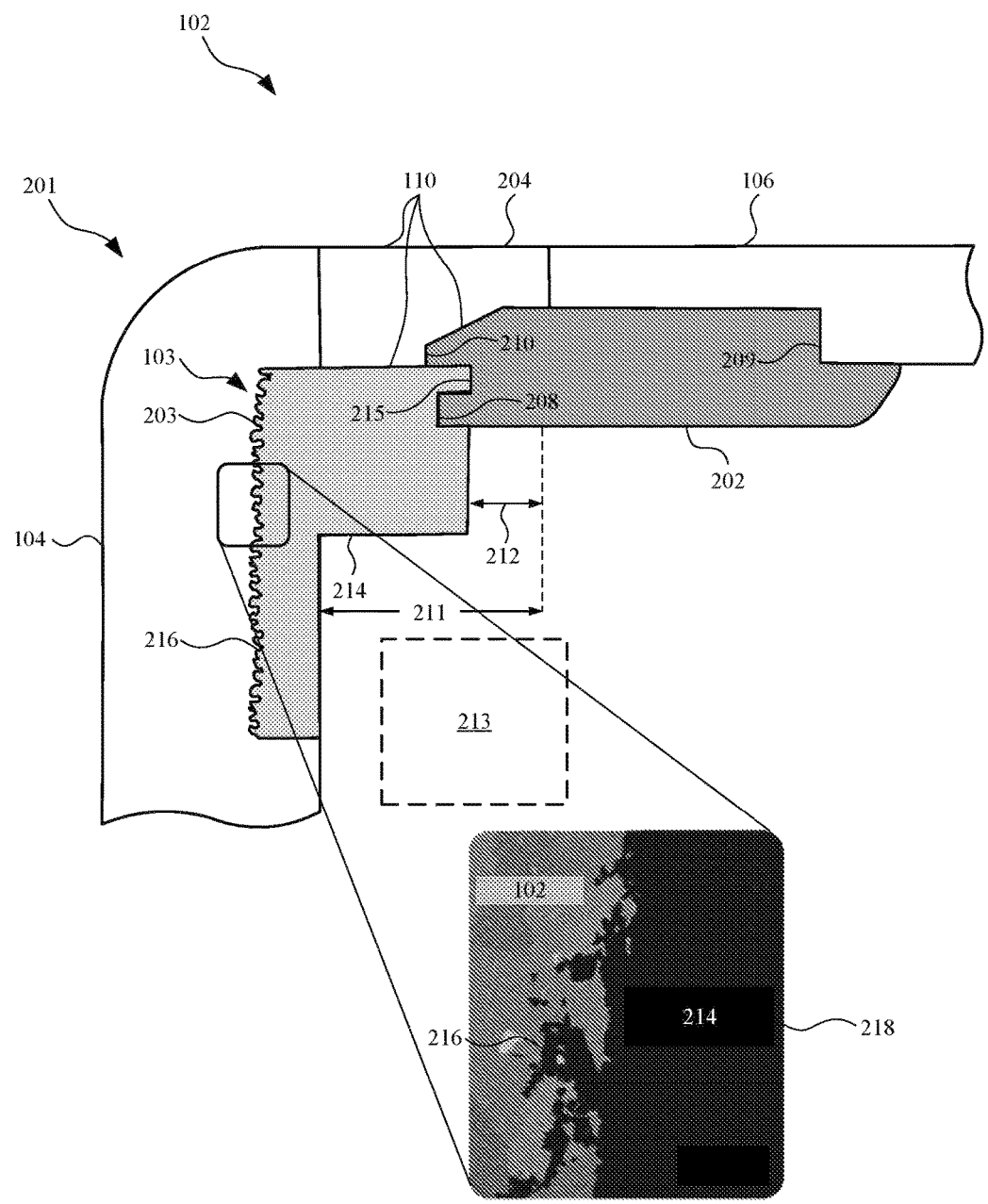
FIGS. 3A-3C show a cross section views of a portion of the enclosure of FIG. 1, in accordance with some other embodiments.

FIG. 3A shows a cross section view A-A of enclosure 102, in accordance with another embodiment. In this embodiment, RF transparent region 110 includes three sections: mediating RF transparent section 214, structural RF transparent section 202 and cosmetic RF transparent section 204. Mediating RF transparent section 214 can engage with interface surface 203 of first metal section 104. Interface surface 203 can be within a recess 103 of first metal section 104 to improve engagement between mediating RF transparent section 214 and first metal section 104. Mediating RF transparent section 214 can include interlock features 215 that engage with corresponding interlock feature 208 of structural RF transparent section 202. In this way, mediating RF transparent section 214 can be referred to as an anchor. However, since mediating RF transparent section 214 is RF transparent, this increases the area of a transmission region of enclosure 102. For example, the transmission region can be a gap defined by length 211. In some cases, length 211 corresponds to a width of cosmetic RF transparent section 204. In a particular embodiment, mediating RF transparent section 214 increases the transmission region to a length 211 of about 2.0 mm. This increase in the transmission region can correlate with increased performance of antenna 213. In some cases, the performance of antenna 213 may be good enough that it may be desirable to shorten length 211 in order reduce the relative area of cosmetic RF transparent section 204 with respect to an exterior surface 201 of enclosure 102. For example, length 211 of cosmetic RF transparent section 204 could potentially be reduced to 0.6 mm. In this way, the addition of mediating RF transparent section 214 can add a functional benefit of improved RF transmission capability and a cosmetic benefit of potentially smaller non-metal exterior surfaces of enclosure 102. This provides flexibility in designing enclosure 102 while balancing and tuning function and cosmetic aspects.

As shown, mediating RF transparent section 214 is engaged with both structural RF transparent section 202 and cosmetic RF transparent section 204. Cosmetic RF transparent section 204 can cover and prevent structural RF transparent section 202 and mediating RF transparent section 214 from being visible. That is, cosmetic RF transparent section 204 can prevent structural RF transparent section 202 and mediating RF transparent section 214 from defining exterior surface 201 of enclosure 102. This can be useful when mediating RF transparent section 214 and/or structural RF transparent section 202 are made of material that does not have a desirable aesthetic quality, such as a desired texture, consistency, color or hardness. However, in some embodiments, mediating RF transparent section 214 and/or structural RF transparent section 202 do have desirable aesthetic qualities. Therefore, cosmetic RF transparent section 204 can be an optional member of RF transparent section 110. In some embodiments, the interfaces between structural RF transparent section 202, cosmetic RF transparent section 204, and mediating RF transparent section 214 can be enhanced by re-melting during injection molding processes. These aspects will be described further below with reference to FIGS. 4A-4E.

In some embodiments, methods are employed to increase the adhesion strength between mediating RF transparent section 214 and first metal section 104. For example, first metal section 104 can be treated prior to molding of mediating RF transparent section 214 to increase the surface area of an interface surface of first metal section 104. In a particular embodiment, interface surface 203 of first metal section 104 is chemically treated to create a porous interface surface. That is, interface surface 203 can be treated to create numerous small pores 216. The type of treatment will depend, in part, on the material of first metal section 104. Suitable chemical treatment for metals such as aluminum or aluminum alloys can include, for example, and acid etching process. Pores 216 can be very small. For example, pores 216 can have an average diameter on a scale of micrometers (micro pores)—that is, smaller than one millimeter. In some embodiments, pores 216 have an average diameter on the scale of nanometers (nano pores)—that is, smaller than one micrometer. Once first metal section 104 is conditioned to have pores 216, mediating RF transparent section 214 can be molded into pores 216 to create a tightly knit bond between mediating RF transparent section 214 and first metal section 104. Inset 218 shows a close-up image of pores 216 with material of mediating RF transparent section 214 formed therein. Since pores 216 are very small and the material of mediating RF transparent section 214 fills pores 216, a tight mechanical interlock is created.

Since pores 216 are very small, it may be difficult to completely fill pores 216 with the material of mediating RF transparent section 214. In some embodiments, flowable material of mediating RF transparent section 214 (e.g., RF transparent in molten form) is molded on first metal section 104 using a high pressure injection molding process such that pores 216 are completely filled or nearly completely filled. Details of such a high pressure injection molding process will be described below further with reference to FIGS. 4A-4E.

Figure 3B:
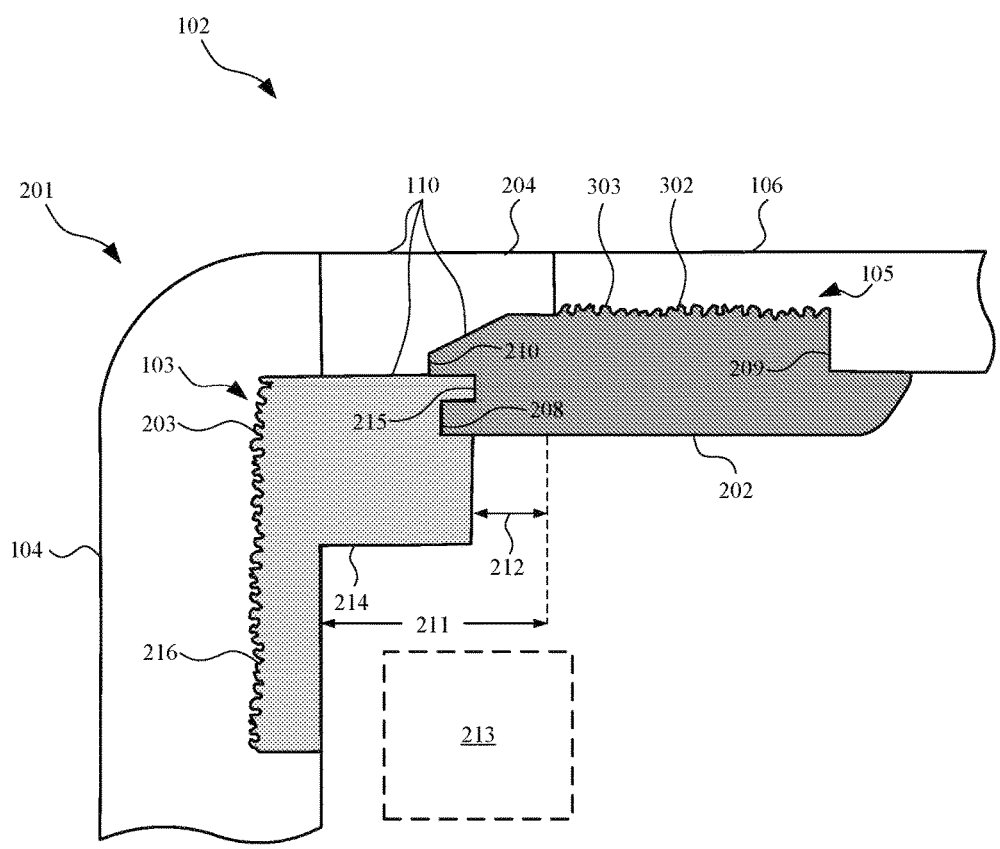

FIG. 3B shows a cross section view A-A of enclosure 102, in accordance with another embodiment. RF transparent region 110 includes three sections: mediating RF transparent section 214, structural RF transparent section 202, and cosmetic RF transparent section 204. Mediating RF transparent section 214 can engage with interface surface 203 of first metal section 104, with interface surface 203 positioned within recess 103 of first metal section 104 for improved engagement. Interface surface 203 can include small pores 216 (e.g., micro pores or nano pores) for further increased engagement between mediating RF transparent section 214 and first metal section 104. Mediating RF transparent section 214 can include interlock features 215 that engage with corresponding interlock feature 208 of structural RF transparent section 202. In the embodiment of FIG. 3B, interface surface 303 of second metal section 106, formed within recess 105 of second metal section 106, is also treated to have pores 302 (e.g., micro pores and/or nano pores). That is, first metal section 104 can have a first set of pores 216 and second metal section 106 can have a second set of pores 302. The material of structural RF transparent section 202 is molded within pores 302 of second metal section 106.

Figure 3C:
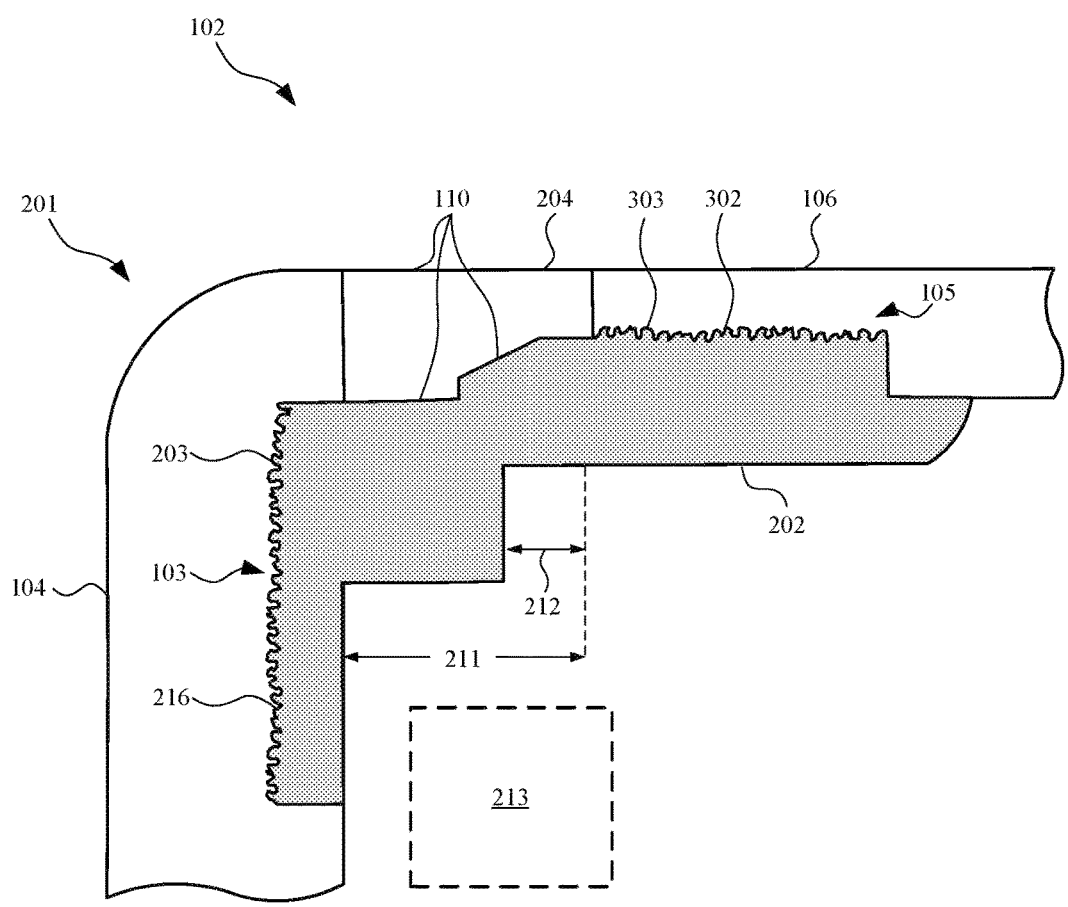

FIG. 3C shows a cross section view A-A of enclosure 102, in accordance with a further embodiment. In this embodiment, RF transparent region 110 includes two sections: anchor or mediating RF transparent section 214 and cosmetic RF transparent section 204. Mediating RF transparent section 214 can secure first metal section 104 and second metal section 106. Cosmetic RF transparent section 204 can cover mediating RF transparent section 214. Mediating RF transparent section 214 can be formed of a flowable material (e.g., in molten form) incorporated within pores 216 formed within recessed interface surface 203 of first metal section 104 and pores 302 formed within recessed interface surface 303 of second metal section 106. In other embodiments, only first metal section 104 has pores 216 while second metal section 106 does not have pores 302. In yet other embodiments, second metal section 106 has pores 302 while first metal section 104 does not have pores 302. That is, one or both of first metal section 104 and second metal section 106 can have pores 216/302 capable of interlocking with RF transparent section 110 that couples mechanically couples first metal section 104 and second metal section 106. In this way, radio frequency transparent anchor or mediation section 214 defines a radio frequency transmission region of enclosure 102 that includes a gap defined by length 211 between the first metal section 104 and second metal section 106.

FIGS. 4A-4E show perspective views of enclosure 102 being formed using processes in accordance with some embodiments. At FIG. 4A, first metal section 104 of enclosure 102 is provided. At this point, first metal section 104 can be in the form of a block or buck since one or more shaping processes can be used to form a final shape of first metal section 104. First metal section 104 can be made of any suitable material. In some embodiments, first metal section 104 is made of a metal material, such as aluminum or aluminum alloy.

At 4B, recess 103 is formed within first metal section 104. Recess 103 can define an interface surface 408 for engaging with a molded piece during a subsequent molding process. In some embodiments, interface surface 408 is curved in accordance with a final exterior shape of enclosure 102. Interface surface 408 can be formed using tool 406, which can be controlled by a machine, such as a CNC machine. In some embodiments, grooves 410 are formed within interface surface 408. Grooves 410 can define the portion of interface surface 408 that is molded on during the subsequent molding process. The surface area of interface surface 408 can be increased by forming micro pores and/or nano pores at interface surface 408. In particular embodiments where first metal section 104 is made of a metal, such as aluminum or aluminum alloy, micro pores and/or nano pores can be formed by an etching process, such as an acid etching process.

Figure 4A:
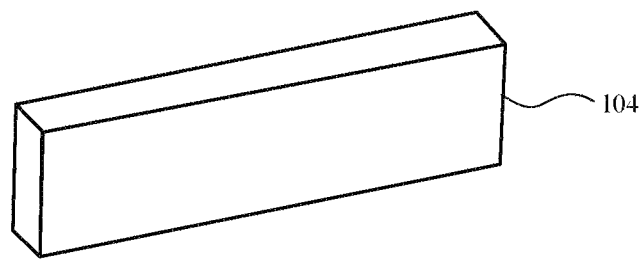
FIGS. 4A-4E show perspective views of the enclosure of FIG. 1 being formed, in accordance with some embodiments.
Figure 4B:
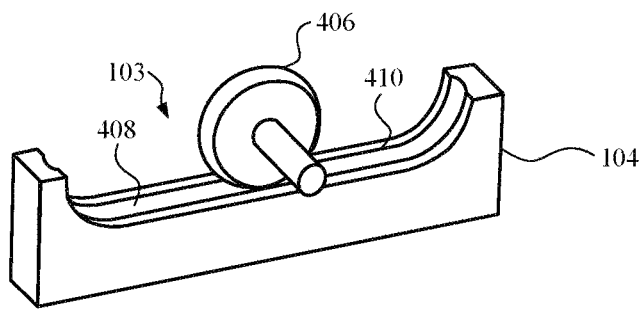
Figure 4C:
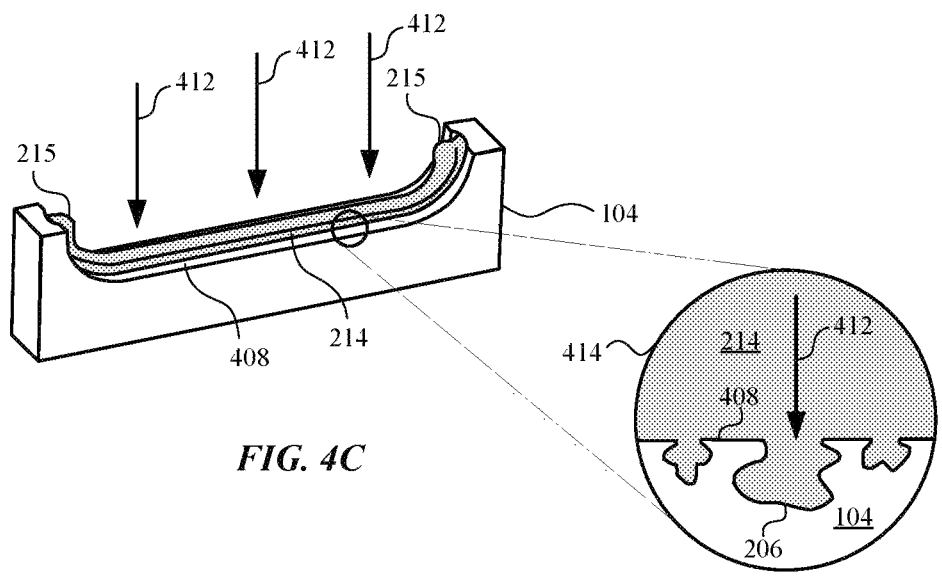

At FIG. 4C, mediating RF transparent section 214 is molded on interface surface 408. That is, the material of RF transparent section 214 while in a flowable state (such as in a molten form from heating) is injection molded onto interface surface 408. As shown, mediating RF transparent section 214 protrudes from interface surface 408 and can have one or more interlock features 215. In some embodiments, an injection molding apparatus capable of injecting the flowable material under high pressure such that material of mediating RF transparent section 214 can be fully molded within the pores of interface surface 408. In some embodiments, pressures in the range of about 30,000 psi are used, with increasing packing pressure (e.g., 35,000 to 40,000 psi) applied as the pores fill. In some embodiments, the pressures are high enough to deform first metal section 104. However, some deformation may be tolerated since first metal section 104 can undergo a post-injection molding shaping process in order to form a final shape.

The gates of the injection molding apparatus can be arranged substantially orthogonal to interface surface 408, as indicated by arrows 412. As illustrated in inset 414 showing a cross section close up view at interface surface 408, pores 206 of first metal section are generally aligned orthogonal to interface surface 408. Thus, the flow 412 of material orthogonal to interface surface 408 amounts to substantially parallel flow of material with respect to pores 206. This type of flow can further assure that pores 206 are sufficiently filled to provide extra strength adhesion between first metal section 104 and mediating RF transparent section 214. In this way, mediating RF transparent section 214 adhered to first metal section 104 can be referred to as a compound structure, with pores 206 acting as an interlock feature of first metal section 104. It should be noted that this is contrary to conventional processes that would likely avoid direct high pressure injection molding with orthogonal flow of material relative to interface surface 408 since such conditions may bend first metal section 104. In the methods described herein, however, some bending of first metal section 104 can be tolerated since first metal section 104 can be shaped subsequent to the injection molding process. After the injection molding process is complete, one or more processes can be used to further shape mediating RF transparent section 214, such as one or more machining, deburring or degating processes.

Figure 4D:
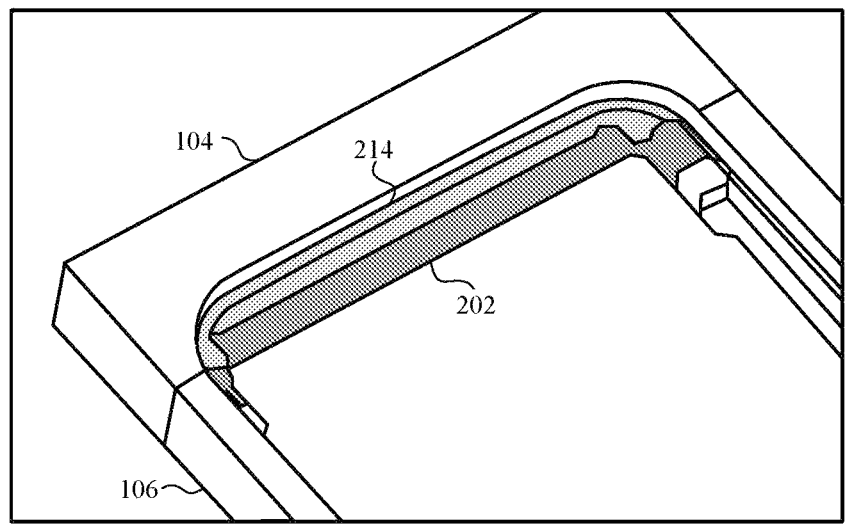

FIG. 4D shows first metal section 104 positioned next to second metal section 106. As with first metal section 104, second metal section 106 at this point can be in the form of a block since subsequent shaping can take place. Structural RF transparent section 202 is then molded on second metal section 106 and mediating RF transparent section 214, thereby coupling first metal section 104 and second metal section 106. Structural RF transparent section 202 can engage with interlock features 215 (shown in FIG. 4C) of mediating RF transparent section 214. In some embodiments, the molding process involves partially re-melting the material of mediating RF transparent section 214 such that structural RF transparent section 202 is more firmly adhered to mediating RF transparent section 214. For example, the molding process can be designed to locally liquefy mediating RF transparent section 214 at reinforcement/bonding points such that the material of structural RF transparent section 202 partially intermingles with the material of mediating RF transparent section 214 during the molding process. In some embodiments, the coupling of first metal section 104 and second metal section 106 is enhanced using ultrasonic welding techniques, laser welding techniques and/or use of adhesive(s).

Figure 4E:
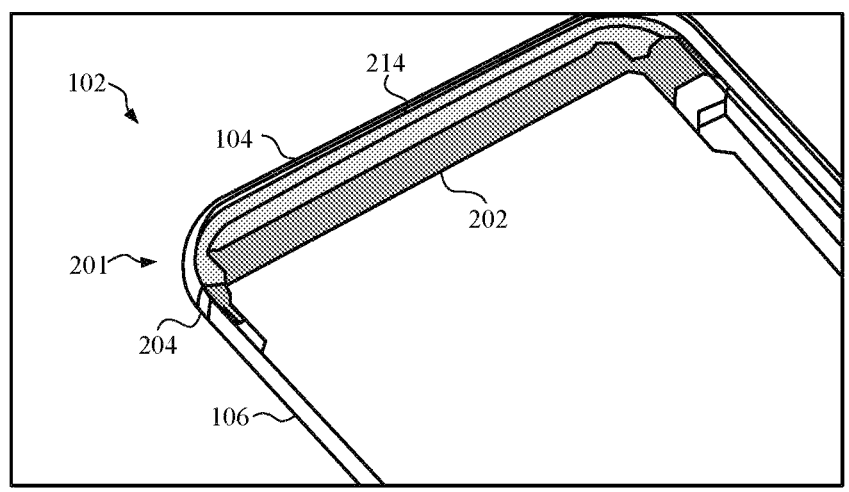

At FIG. 4E, cosmetic RF transparent section 204 is molded on structural RF transparent section 202 and mediating RF transparent section 214, and between first metal section 104 and second metal section 106. In some embodiments, the molding process involves a re-melting process, as described above, that intermingle the material of cosmetic RF transparent section 204 with the material of structural RF transparent section 202 and/or mediating RF transparent section 214, thereby forming a stronger bond. In addition, first metal section 104 and second metal section 106 are shaped to a final shape. The shaping and/or finishing processes can create a smooth and continuous exterior surface 201 of enclosure 102. Any suitable shaping process and/or finishing process can be used. For example, one or more machining (e.g., CNC), polishing, blasting and/or anodizing processes can be used. Note that the shaping process can compensate for some, if any, deformation of first metal section 104 and/or second metal section 106 during previous molding processes. An anodizing process can be used to anodize first metal section 104 and second metal section 106. Thus, if cosmetic RF transparent section 204, mediating RF transparent section 214 and structural RF transparent section 202 are made of plastic material(s), the plastic material(s) should be resistant to substantial degradation when exposed to the anodizing process.

Referring back to FIG. 1, it should be noted that the processes described above with respect to coupling first metal section 104, second metal section 106 with first RF transparent region 110 (including structural RF transparent section 202, mediating RF transparent section 214, and cosmetic RF transparent section 204) can be used to couple third metal section 108 with second metal section 106 using second RF transparent region 112. That is, second RF transparent region 112 can include a corresponding structural RF transparent section, mediating RF transparent section, and cosmetic RF transparent section that are arranged similarly to structural RF transparent section 202, mediating RF transparent section 214, and cosmetic RF transparent section 204.

Figure 5:
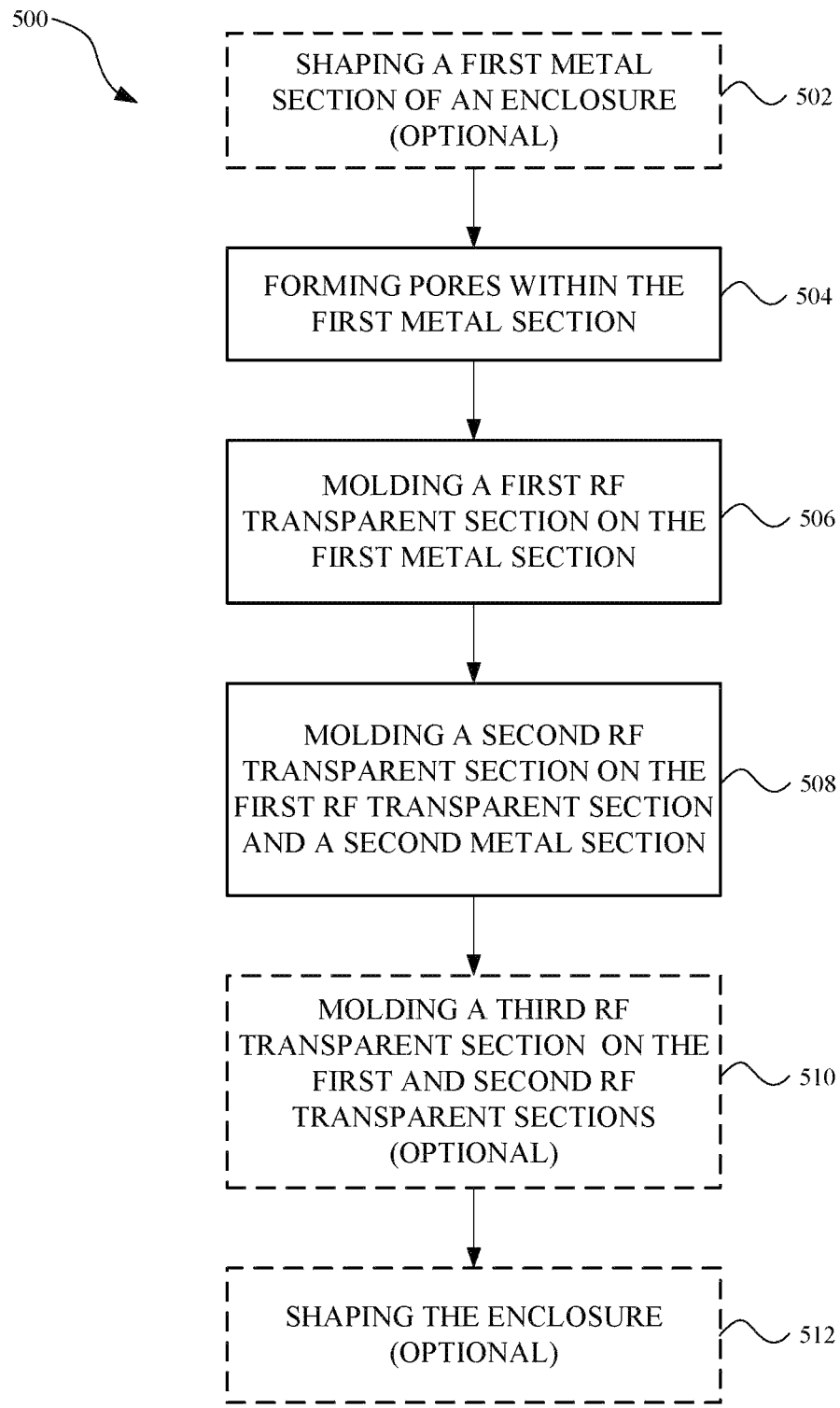
FIG. 5 shows a flowchart indicting a process for forming an enclosure, in accordance with some embodiments.

FIG. 5 shows flowchart 500 indicating a process for forming an enclosure, in accordance with some embodiments. At 502, a first metal section of the enclosure is optionally shaped using one or more shaping processes. In some embodiments, the first metal section is made of an aluminum alloy. The optional shaping process can involve creating a general shape that has dimensions roughly close to a final shape of the first metal section. In one embodiment, the shaping process includes forming recesses and engagement features within the first metal section.

At 504, small pores are formed within an interface surface of the first metal section. The pores can be micro pores, meaning an average diameter of the pores is on a scale of micrometers, and/or nano pores, meaning an average diameter of the pores is on a scale nanometers. The pore forming process will depend, in part, on the material of the first metal section. In a particular embodiment where the first metal section is made of aluminum or aluminum alloy, an acid etching process is used.

At 506, a first RF transparent section (e.g., mediating RF transparent section 214) is molded on the interface surface of the first metal section. Material of the first RF transparent section is molded within the pores of the first metal section. The material of the first RF transparent section can be chosen such that optimal flow within the pores is achieved. In some embodiments, a high pressure injection molding process is used. Injection molding gates can be positioned to provide substantially parallel flow of the material relative to the pores such that the pores are sufficiently filled to provide good adhesion between the first RF transparent section and the first metal section. In some embodiments, the first RF transparent section includes a fiber composite material having fibers within a resinous base. In some embodiments, the fibers are made of glass. During injection molding process, fibers having small enough dimensions may fit within the pores, while fibers having larger dimensions do not fit within the pores. In some embodiments, the average size of the fibers is chosen to be small enough to fit within the pores. In any case, at least the resinous base material should be injectable within the pores.

In addition to choosing a material that provides good flow within the pores, the material of the first section can also be chosen to provide sufficient re-melting during a subsequent molding processes for applying a second RF transparent section and a third RF transparent section. In some embodiments, one or more interlock features are formed on the first RF transparent section, which is configured to interlock with a subsequently molded second RF transparent section. The interlock feature(s) can include one or more protrusion and/or recesses.

At 508, a second RF transparent section (e.g., structural RF transparent section 202) is molded on the first RF transparent section and a second metal section. In some embodiments, second RF transparent section is made of the same material as the first RF transparent section. In other embodiments, the second RF transparent section is made of a different material that the first RF transparent section, such as a stiffer resinous material. In some embodiments, the molding process is designed to locally re-melt the material of the first RF transparent section such that a stronger bond is formed between the first RF transparent section and the second RF transparent section. If the first RF transparent section has interlock features, the second RF transparent section can be molded around and/or within the interlock features, forming corresponding interlock features within the second RF transparent section.

At 510, a third RF transparent section (e.g., cosmetic section RF transparent section 204) is optionally molded on the first and second RF transparent sections. The third RF transparent section can cover the first and second RF transparent sections such that the first RF transparent section and the second RF transparent section do not form an exterior surface of the enclosure. This can be useful when the first and second RF transparent sections do not have desired cosmetic or aesthetic properties. For example, the first and second RF transparent sections may have good structural integrity but do not have a desired continuous and uniform look and feel. Or the first and second RF transparent sections may not have a desired color and predetermined fade-resistance. In some embodiments, the first RF transparent section, the second RF transparent section and the third RF transparent section are each free of metal material in order to retain good RF transparent properties of the RF transparent region.

At 512, the enclosure is optionally shaped such that an exterior surface of the enclosure has a predetermined shape and/or smoothness. This can involve co-machining the first metal section, second metal section and the third RF transparent section. In addition, the enclosure can be finished using one or more finishing processes such as polishing, blasting, buffing and/or anodizing. It should be noted that additional metal sections of the enclosure can be coupled using additional RF transparent sections. The finished enclosure will have an RF transmission region defined by the RF transparent section(s) and that allows RF waves to pass through.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The invention claimed is:

1. An electronic device comprising:
   an enclosure comprising:
     a first metal section defining a first portion of an exterior surface of the enclosure and an interface surface having a pore with a opening size of less than one millimeter;
     a second metal section defining a second portion of the exterior surface of the enclosure; and
     a radio-frequency (RF) transparent section including an RF transparent material positioned at least partially within a gap between the first metal section and the second metal section and at least partially filling the pore; and
   an antenna positioned within the enclosure and configured to pass RF signals through the RF transparent section.

2. The electronic device of claim 1, wherein the interface surface is a first interface surface and the second metal section defines a second interface surface having a second pore, wherein the RF transparent section is engaged with the second interface surface of the second metal section and wherein some of the RF transparent material is positioned within the second pore.

3. The electronic device of claim 1, wherein the RF transparent section is a first RF transparent section, wherein the enclosure includes a second RF transparent section secured to the first RF transparent section, the second RF transparent section engaged with the second metal section.

4. The electronic device of claim 3, wherein the second RF transparent section is engaged with a second interface surface of the second metal section.

5. The electronic device of claim 1, wherein the RF transparent section is composed of a fiber composite material including fibers within a resinous base.

6. The electronic device of claim 1, wherein the opening size of the pore is less than one micrometer.

7. An enclosure for an electronic device, the enclosure comprising:
   a first metal section defining a first portion of an exterior surface of the electronic device;

a second metal section defining a second portion of the exterior surface of the electronic device; and a radio frequency (RF) transparent section positioned at least partially within a gap defined between the first and second metal sections and securing the first metal section with the second metal section, the RF transparent section formed of an RF transparent material incorporated within pores of at least one of the first metal section or the second metal section, the pores having width of less than one millimeter.

8. The enclosure of claim 7, wherein the first metal section includes a first set of pores and the second metal section includes a second set of pores.

9. The enclosure of claim 7, wherein the RF transparent section is a first RF transparent section, wherein the enclosure includes a second RF transparent section secured to the first RF transparent section.

10. The enclosure of claim 9, wherein the first RF transparent section and the second RF transparent section include corresponding interlock features interlocking the first RF transparent section and the second RF transparent section.

11. The enclosure of claim 9, wherein the first RF transparent section is composed of a different material than the second RF transparent section.

12. The enclosure of claim 11, wherein the second RF transparent section is made of a more rigid material than the first RF transparent section.

13. The enclosure of claim 9, wherein the enclosure includes a third RF transparent section that covers the first RF transparent section and the second RF transparent section.

14. The enclosure of claim 13, wherein the third RF transparent section forms an antenna band that fills a portion of the gap between the first metal section and the second metal section.

15. The enclosure of claim 7, wherein the width of the pores are less than one micrometer.

16. The enclosure of claim 7, wherein the RF transparent section is composed of fibers within a resinous base.

17. A method of forming an enclosure for an electronic device, the enclosure including a first metal section and a second metal section, the method comprising:

forming pores at an interface surface of the first metal section;

coupling the first metal section to the second metal section by molding an RF transparent section on the second metal section and within the pores on the interface surface of the first metal section.

18. The method of claim 17, wherein the first RF transparent section includes fibers within a resinous base.

19. The method of claim 17, wherein:

the RF transparent section comprises a first RF transparent section and a second RF transparent section; and molding the RF transparent section on the second metal section and within the pores of the interface surface of the first metal section comprises:

molding the first RF transparent section on the interface surface of the first metal section and forming interlock features within the first RF transparent section; and molding the second RF transparent section within the interlock features of the first RF transparent section.

20. The method of claim 19, further comprising:

molding a cosmetic RF transparent section of the RF transparent section on the first RF transparent section and the second RF transparent section such that the cosmetic RF transparent section covers the first RF transparent section and the second RF transparent section.

* * * * *